US 8,254,856 B2

(12) United States Patent
Hue et al.

(10) Patent No.: US 8,254,856 B2
(45) Date of Patent: Aug. 28, 2012

(54) METHOD AND SYSTEM FOR PROCESSING IMPERFECTIONS OF A RADIO FREQUENCY TRANSMISSION SUBSYSTEM AND COMMUNICATION APPLIANCE INCORPORATING SUCH A TRANSMISSION SUBSYSTEM

(75) Inventors: Antoine Hue, Saint Genis Pouilly (FR); Gabriel Della-Monica, Moirans (FR)

(73) Assignees: STMicroelectronics N.V., Amsterdam (NL); STMicroelectronics (Grenoble) SAS, Grenoble (FR)

( * ) Notice: Subject to any disclaimer, the term of this patent is extended or adjusted under 35 U.S.C. 154(b) by 434 days.

(21) Appl. No.: 12/505,701

(22) Filed: Jul. 20, 2009

(65) Prior Publication Data
US 2010/0046669 A1 Feb. 25, 2010

(30) Foreign Application Priority Data

Jul. 25, 2008 (EP) .................................... 08305423

(51) Int. Cl.
*H04B 1/04* (2006.01)
*H04L 25/03* (2006.01)

(52) U.S. Cl. ............... 455/114.3; 455/114.2; 455/115.1; 455/114.1; 375/296

(58) Field of Classification Search ............... 455/114.2, 455/114.3, 115.1, 115.2, 115.3, 67.11, 67.14
See application file for complete search history.

(56) References Cited

U.S. PATENT DOCUMENTS

| | | | | |
|---|---|---|---|---|
| 4,717,894 A | | 1/1988 | Edwards et al. | 332/144 |
| 5,119,399 A | | 6/1992 | Santos et al. | 375/224 |
| 5,126,687 A | * | 6/1992 | Onoda et al. | 330/149 |
| 5,663,691 A | | 9/1997 | Kowalik et al. | 332/103 |
| 6,133,789 A | * | 10/2000 | Braithwaite | 330/149 |
| 6,384,677 B2 | * | 5/2002 | Yamamoto | 330/10 |
| 6,574,286 B2 | | 6/2003 | McVey | 375/308 |
| 6,704,551 B2 | | 3/2004 | Riou et al. | 455/115.1 |
| 6,760,577 B2 | | 7/2004 | Li | 455/323 |
| 6,819,910 B2 | * | 11/2004 | Shi et al. | 455/126 |
| 6,930,563 B2 | | 8/2005 | Gumm | 332/107 |
| 6,999,744 B2 | | 2/2006 | Kim | 455/310 |
| 7,116,953 B2 | | 10/2006 | Kim et al. | 455/147 |
| 7,298,793 B2 | * | 11/2007 | Wu et al. | 375/296 |

(Continued)

FOREIGN PATENT DOCUMENTS

EP 1396973 3/2004
(Continued)

OTHER PUBLICATIONS

Vasudev, N. et al., "Near-Ideal RF Upconverters," IEEE Transactions on Microwave Theory Techniques, vol. 50, No. 11, Nov. 2002, pp. 2569-2575.

(Continued)

*Primary Examiner* — Duc M Nguyen
(74) *Attorney, Agent, or Firm* — Allen, Dyer, Doppelt, Milbrath & Gilchrist, P.A.

(57) ABSTRACT

A method processes defects in a radio frequency transmission subsystem due to elements therein. The defects may include mismatch between two channels in phase quadrature in the transmission subsystem and a transposition signal leaking from a first frequency transposition stage of the transmission subsystem. The method may include calibration processing including estimating compensation parameters representative of the defects. The estimating may include delivering, into the transmission subsystem upstream of the elements creating the defects, a reference signal having a reference frequency, obtaining, downstream of the first transposition stage, of a resultant reference signal, and obtaining, from the resultant reference signal, of an approximate value for each compensation parameter. The method also may include compensating for the defects by injecting the approximate values into the transmission subsystem.

34 Claims, 9 Drawing Sheets

U.S. PATENT DOCUMENTS

| | | | |
|---|---|---|---|
| 7,340,223 B1 * | 3/2008 | Wright et al. | 455/91 |
| 7,760,817 B2 | 7/2010 | Lin | 375/302 |
| 7,844,015 B2 * | 11/2010 | Assouline | 375/298 |
| 7,941,106 B2 * | 5/2011 | Cloutier et al. | 455/115.1 |
| 8,010,064 B2 * | 8/2011 | Kim et al. | 455/115.2 |
| 2002/0191710 A1 * | 12/2002 | Jeckeln et al. | 375/296 |
| 2004/0032913 A1 * | 2/2004 | Dinur | 375/298 |
| 2004/0116083 A1 * | 6/2004 | Suzuki et al. | 455/126 |
| 2004/0196925 A1 | 10/2004 | Moore et al. | 375/308 |
| 2005/0148304 A1 | 7/2005 | Jerng | 455/75 |
| 2007/0189371 A1 | 8/2007 | Yen | 375/221 |

FOREIGN PATENT DOCUMENTS

| | | |
|---|---|---|
| EP | 1755302 | 2/2007 |
| EP | 1924042 | 5/2008 |

OTHER PUBLICATIONS

Cavers, "New methods for adaptation of quadrature modulators and demodulators in amplifier linearization circuits", IEEE, vol. 46, No. 3, Aug. 1997, pp. 707-716.

Cavers, "The effect of quadrature modulator and demodulator errors on adaptive digital predistorters for amplifier linearization", IEEE, vol. 46, No. 2, May 1997, pp. 456-466.

Ding et al., "Frequency-dependent modulator imbalance in predistortion linearization systems: modeling and compensation", Porc. Asilomar Conf. Signals, Nov. 2003, pp. 688-692.

Anttila et al., "Frequency-selective I/Q mismatch calibration of wideband direct-conversion transmitters", IEEE Express Briefs, vol. 55, No. 4, Apr. 2008, pp. 359-363.

* cited by examiner

METHOD AND SYSTEM FOR PROCESSING IMPERFECTIONS OF A RADIO FREQUENCY TRANSMISSION SUBSYSTEM AND COMMUNICATION APPLIANCE INCORPORATING SUCH A TRANSMISSION SUBSYSTEM

FIELD OF THE INVENTION

The invention relates to the processing of defects in a radio frequency transmission subsystem, for example, mismatches affecting two channels in phase quadrature of the transmission subsystem and/or a transposition signal leaking from a first frequency transposition stage of the transmission subsystem.

BACKGROUND OF THE INVENTION

The Worldwide Interoperability for Microwave Access (WiMAX) standards are a family of communication standards defining high-bit rate connections by radio channel for point-to-multipoint architectures. The WiMAX standards notably include the standards of the IEEE 802.16 family. The standards of the IEEE 802.11 family, also known as "WiFi standards", are the international standard describing the characteristics of a wireless local area network (WLAN) capable of communicating at high bit rates over a radius of several meters.

In Digital Video Broadcasting (DVB), the mismatches of the two channels in phase quadrature (channels I and Q according to the designation used by those skilled in the art) of the transmission subsystem (defects also designated by those skilled in the art as "IQ mismatch") and the transposition signal leaks from a frequency transposition stage (also known by those skilled in the art by the acronym "LO leakage") are defects that are known in the transmission subsystems of radio frequency devices. These subsystems have architecture of the direct-conversion type, also called Zero Intermediate Frequency (ZIF), or an architecture of the superheterodyne type, i.e. with a low or high non-zero intermediate frequency.

Generally, the mismatches of the two channels in quadrature are of two different types, namely a phase mismatch and a gain mismatch. The gain mismatch originates in all the stages having a gain extending from the digital-to-analog converter stage to the first frequency transposition stage. This is because, in this area, the I and Q channels are amplified separately. The phase mismatch originates in the generation of the frequency transposition signals used by the mixers situated on the I and Q channels. These signals are not, in practice, strictly mutually orthogonal in phase, i.e. not strictly in phase quadrature.

Regarding the defect due to the transposition signal leaking, this originates in the transposition stage and is characterized by an unwanted frequency component situated in the center of the radio frequency band. The compensation and the calibration of the mismatches and of the transposition signal leaks have hitherto been the subject of several different approaches.

A first approach comprises eliminating the quadrature error in the design of the circuit for generating frequency transposition signals in quadrature. However, such approaches are complicated and can lead to an inadequate rejection of the image signal for high-order modulations, such as the 64 QAM and 256 QAM modulations. Factory calibration is also an approach for correcting the imperfections mentioned hereinabove. The measured mismatches are either compensated by analog means, for example, by resistors and variable capacitors, or through the intermediary of a digital pre-distortion, the control value of which is stored in a non-volatile memory.

However, a factory calibration is costly and does not make it possible to take into account the variations of these mismatches associated with temperature and power supply voltage variations. Thus, other approaches recommend an on-chip calibration. Such approaches are generally based on a quadratic measurement of the power envelope of the signal leading to an iterative estimation of the mismatches. However, such an iterative search is lengthy, which can prove incompatible with the particular requirements of certain standards, such as the WiMAX standards. Furthermore, it is difficult to obtain a good quality envelope detector. Other approaches recommend statistical calculations on the whole signal sent in order to determine the mismatches and the local oscillators leaks. However, these approaches are also costly in terms of time.

SUMMARY OF THE INVENTION

According to an embodiment, there is a method and a device for processing defects of a radio frequency transmission subsystem and for making it possible to limit the additional hardware used to handle the processing of these imperfections. According to another embodiment, there is a method and a device for processing such defects that make it possible to obtain a direct, and therefore rapid, measurement of the mismatches and/or of the transposition signal links.

There is also another embodiment for a method and a system for processing such defects that allow for a simultaneous calibration of the mismatches of the two channels in phase quadrature and of the transposition signal leaks. By being able to offer a faster and better quality calibration, it is possible to perform, for example, more complete calibrations taking into account in particular all the gain combinations as well as all the carrier frequencies. It is also possible, for example, to perform more frequent calibrations and address accurately the variations due to temperature or power supply voltage.

According to a first aspect, there is a method of processing defects of a radio frequency transmission subsystem due to elements of the subsystem. The imperfections include mismatches of the two channels in phase quadrature of the transmission subsystem and/or transposition signal leaks from a first frequency transposition stage of the subsystem. The method may comprise a calibration processing operation including a phase for estimating compensation parameters representative of the imperfections, and a compensation phase including taking into account these parameters in the transmission subsystem.

According to this first aspect, the estimation phase comprises a delivery, into the transmission subsystem upstream of the elements originating the imperfections, of a reference signal having a reference frequency, the obtaining, downstream of the first transposition stage, of a resultant reference signal, and a direct obtaining, from this resultant reference signal, of an approximate value for each compensation parameter. Moreover, the compensation phase may comprise an injection of these approximate values into the transmission subsystem.

Thus, according to this aspect, a set of compensation parameters can be directly extracted from just the measurement of the resultant reference signal, i.e. without requiring as in the prior art, iterative methods such as iterative minimum searches, or even indirect measurements through, for example, a quadratic envelope detection. When the transmission subsystem has an architecture of the direct-conversion type, the first frequency transposition stage may be the only frequency transposition stage of the subsystem.

According to another embodiment, in which the transposition signal of the first transposition stage has a first transposition frequency, the direct obtaining of the approximate values of the compensation parameters may include: a non-quadratic downward auxiliary frequency transposition of the resultant reference signal with an auxiliary transposition frequency, preferably different from the first transposition frequency, so as to obtain a transposed reference signal, an analog-to-digital conversion of a signal obtained from the transposed reference signal so as to obtain a digital signal, and a coherent estimation of the approximate values taking into account the phase of the digital signal.

In other words, according to such an embodiment, instead of measuring a power envelope, in this case, a coherent estimation of the values of the set of compensation parameters is performed, i.e. an estimation that takes into account the phase of the measured signal and the phase of the digital signal obtained from the transposed reference signal. The transposed reference signal may include, for example, a first frequency component representative of an echo of the reference signal.

The first frequency component may have a first frequency. The transposed reference signal also may include a second frequency component, representative of an echo of the transposition signal leaks and having a second frequency. The transposed reference signal can also include a third frequency component. The third frequency component may be the image of the first frequency component and may have a third frequency.

The approximate values of the compensation parameters representative of the transposition signal leaks, or the approximate values of the compensation parameters representative of the mismatches of the two channels in phase quadrature may be determined. The compensation parameters representative of the transposition signal leaks and of the mismatches of the two channels in phase quadrature may also be determined.

When considering a determination of the compensation parameters representative of the transposition signal leaks, the coherent estimation of the approximate values of these parameters may include, for example, a first processing operation for correlating the digital signal with a complex exponential having the first frequency, and a second processing operation for correlating the digital signal with a complex exponential having the second frequency. These two correlation processing operations may be performed with the same phase of the digital signal, for example, with the same samples of the digital signal. The coherent estimation of the approximate values of these parameters may also include the determination of a ratio between the result of the second correlation processing operation and the result of the first correlation processing operation.

When there is a desire to determine the compensation parameters representative of the mismatches of the two channels in phase quadrature, the coherent estimation of the approximate values of these parameters may include a first processing operation for correlating the digital signal with a complex exponential having the first frequency, and a third processing operation for correlating the digital signal with a complex exponential having the third frequency. These two correlation processing operations may be performed with the same phase of the digital signal. The coherent estimation of the approximate values of these parameters may include the determination of a ratio between the result of the third correlation processing operation and the result of the first correlation processing operation.

When there is a desire to determine all the compensation parameters relating to the mismatches and to the transposition signal leaks, all the correlation processing operations mentioned previously are performed with the same phase of the digital signal. The first correlation processing operation makes it possible to estimate, in particular, the phase of the digital signal. The non-quadratic downward auxiliary transposition can be performed by any typical method, for example, by way of a typical transposition stage or mixer. It is particularly advantageous to use a sampling and holding of the signal to perform this non-quadratic downward conversion. This allows, in particular, for a saving in hardware since it is possible generally to reuse, for example, the phase-locked loop of the digital part of the transmission subsystem to generate the sampling and holding control frequency.

The estimation phase may be advantageously performed during a period of absence of transmission from the transmission subsystem. Although, as indicated hereinabove, the estimation phase of the calibration processing operation makes it possible to directly obtain from the resultant reference signal a set of compensation parameters without carrying out iterative operations, the values obtained are approximate values. Thus, if there is a desire, for example, to improve the accuracy of these values, it is possible to perform, after the first calibration processing operation, at least a second calibration processing operation identical to the first calibration processing operation.

According to another aspect, there is a system for processing imperfections of a radio frequency transmission subsystem due to elements of the subsystem. The imperfections may include mismatches of the two channels in phase quadrature of the transmission subsystem and/or transposition signal leaks from a first frequency transposition stage of the subsystem. The system may comprise calibration means or a calibration module including estimation means or an estimation module configured to estimate compensation parameters representative of the defects and compensation means or a compensator module configured to take into account these parameters in the transmission subsystem.

According to one characteristic of this other aspect, the estimation means comprise generation means or a generator module being coupled to the transmission subsystem upstream of the elements creating the defects and delivering a reference signal having a reference frequency, and determination means or a determination module coupled downstream of the first transposition stage to receive a resultant reference signal and configured to deliver directly, from this resultant reference signal, an approximate value for each compensation parameter. The compensation means may be configured to receive the approximate values obtained.

According to one embodiment, the transposition signal of the first transposition stage has a first transposition frequency and the determination means may include auxiliary transposition means or an auxiliary transposition module coupled to the output means or the output and configured to perform a non-quadratic downward auxiliary frequency transposition of the resultant reference signal with an auxiliary transposition frequency, preferably different from the first transposition frequency, and deliver a transposed reference signal, analog-to-digital conversion means or an analog-to-digital converter coupled to the output of the auxiliary transposition means and configured to deliver a digital signal, and a processing stage coupled to the output of the analog-to-digital conversion means and configured to perform a coherent estimation of the approximate values taking into account the phase of the digital signal.

According to another embodiment, the transposed reference signal may include a first frequency component representative of an echo of the reference signal and having a first frequency, and a second frequency component representative of an echo of the transposition signal leaks and having a second frequency. The processing stage may be configured to perform a coherent estimation of the approximate values of the compensation parameters representative of the transposition signal leaks from the first frequency transposition stage of the subsystem. The processing stage may include first correlation means or a first correlation module capable of performing a first correlation processing operation on the digital signal with a complex exponential having the first frequency, second correlation means or a second correlation module capable of performing a second correlation processing operation on the digital signal with a complex exponential having the second frequency, these two correlation processing operations being performed with the same phase of the digital signal, and a computation block configured to calculate a ratio between the result of the second correlation processing operation and the result of the first correlation processing operation.

According to another embodiment, the transposed reference signal may include, a first frequency component representative of an echo of the reference signal and having a first frequency, and a third frequency component being the image of the first frequency component and having a third frequency. The processing stage may be configured to perform a coherent estimation of the approximate values of the compensation parameters representative of the mismatches of the two channels in phase quadrature of the transmission subsystem and may include first correlation means or a first correlation module capable of performing a first correlation processing operation on the digital signal with a complex exponential having the first frequency, third correlation means or a third correlation module capable of performing a third correlation processing operation on the digital signal with a complex exponential having the third frequency, these two correlation processing operations being performed with the same phase of the digital signal, and a computation block configured to calculate a ratio between the result of the third correlation processing operation and the result of the first correlation processing operation.

According to another embodiment, the processing stage may be configured to perform all the correlation processing operations with the same phase of the digital signal. The processing stage can include a digital correlator incorporating the correlation means. As a variant, the processing stage can include direct Fourier transform means or a Fourier transformation module incorporating the correlation means. The auxiliary transposition means can include a sampler-holder.

According to one embodiment, the system also may comprise control means or a controller capable of activating the estimation means during a period of absence of transmission in the transmission subsystem. The system can also include monitoring means or a monitor module capable of activating the calibration means at least twice. According to another aspect, there is a radio frequency transmission subsystem of a communication appliance, comprising two channels in phase quadrature and a first frequency transposition stage as well as a system as defined hereinabove. The transmission subsystem can have an architecture of the direct-conversion type.

According to another aspect, there is a communication appliance, for example, a wireless communication appliance, comprising a radio frequency transmission subsystem as defined hereinabove. The communication appliance can include a reception subsystem that at least partly incorporates, for example, the estimation means of the defect processing system as defined hereinabove.

BRIEF DESCRIPTION OF THE DRAWINGS

Other advantages and characteristics of the invention may become apparent from studying the detailed description of implementations and embodiments, by no means limiting, and the appended drawings, in which.

DETAILED DESCRIPTION OF THE PREFERRED EMBODIMENTS

Figure 1:
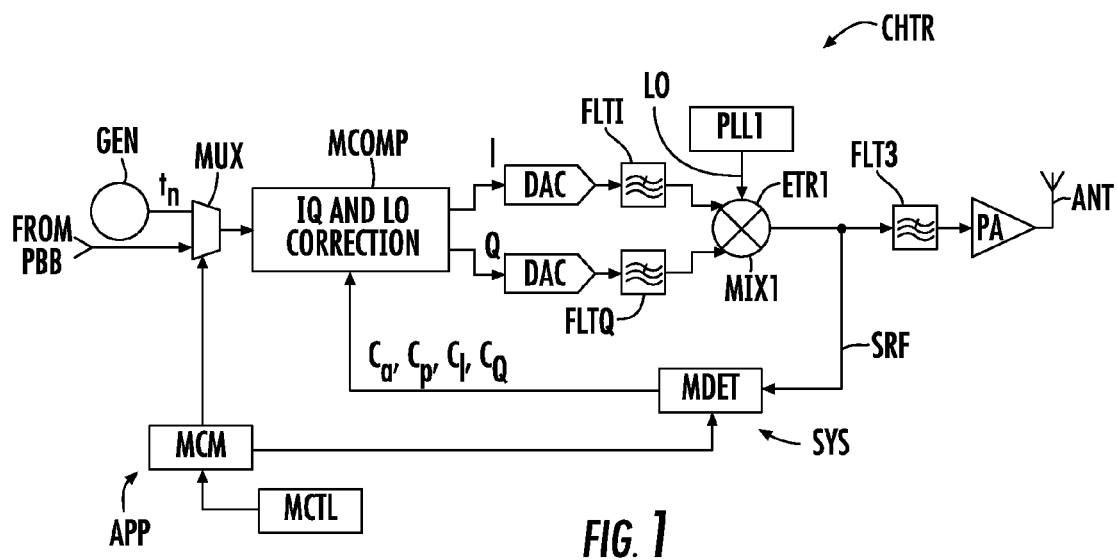
FIG. 1 schematically illustrates an embodiment of a system for processing defects of a radio frequency transmission subsystem incorporated in a communication appliance, according to the present invention.

In FIG. 1, the reference APP designates a communication appliance, for example, a wireless communication appliance, including a transmission subsystem CHTR, only a part of which is illustrated in this FIG. 1. This transmission subsystem includes a digital part and an analog part. The digital part includes a processor delivering baseband data, i.e. data with a frequency spectrum situated in the vicinity of the zero frequency, on two channels in phase quadrature I and Q. The structure of such a processor, called "baseband processor PBB", is known to those skilled in the art.

The analog part of the transmission subsystem CHTR is separated from the digital part by a digital-to-analog converter stage, formed here by two digital-to-analog converters DAC respectively situated on the I and Q channels. Low-pass filters FLTI and FLTQ are respectively situated on the I and Q channels at the output of the digital-to-analog converters PAC.

A frequency transposition stage ETR1 then performs a transposition of the baseband signal received at the output of the filters FLTI and FLTQ into the radio frequency band, by using a transposition signal LO obtained, for example, from a phase-locked loop PLL1.

In FIG. 1, in the interests of simplicity, the transposition stage ETR1 is symbolized by a mixer MIX1. In practice, the stage ETR1 can be produced by two mixers respectively connected to the outputs of the two filters FLTI and FLTQ and receiving, for one of them, the transposition signal LO, and for the other, the transposition signal LO phase-shifted by 90°. The output of the two mixers is then aggregated to be delivered to a high-pass filter FLT3.

In this example, the transmission subsystem is of the direct-conversion type (or zero-intermediate-frequency type). Consequently, the frequency transposition stage ETR1 is the only upward transposition stage of the subsystem. The radio frequency analog part of the transmission subsystem CHTR also includes a power amplifier PA coupled to a transmission antenna ANT.

In addition to the means that have just been described, the appliance APP includes a system SYS for processing defects of the subsystem CHTR.

These imperfections or defects, which are due to elements of the subsystem, include, for example, mismatches of the two channels in phase quadrature I and Q of the transmission subsystem and/or leaks of the transposition signal LO at the level of the frequency transposition stage ETR1. The elements creating the mismatches of the two channels in phase quadrature are, for example, all the elements presenting an amplification gain and extending from the digital-to-analog converter stage DAC up to and including the frequency transposition stage ETR1. It is because, in this part, the two channels are amplified separately. Also worth citing as elements creating the phase mismatch are those creating the generation of the orthogonal transposition signals used respectively in the two mixers of the transposition stage ETR1.

Figure 10:
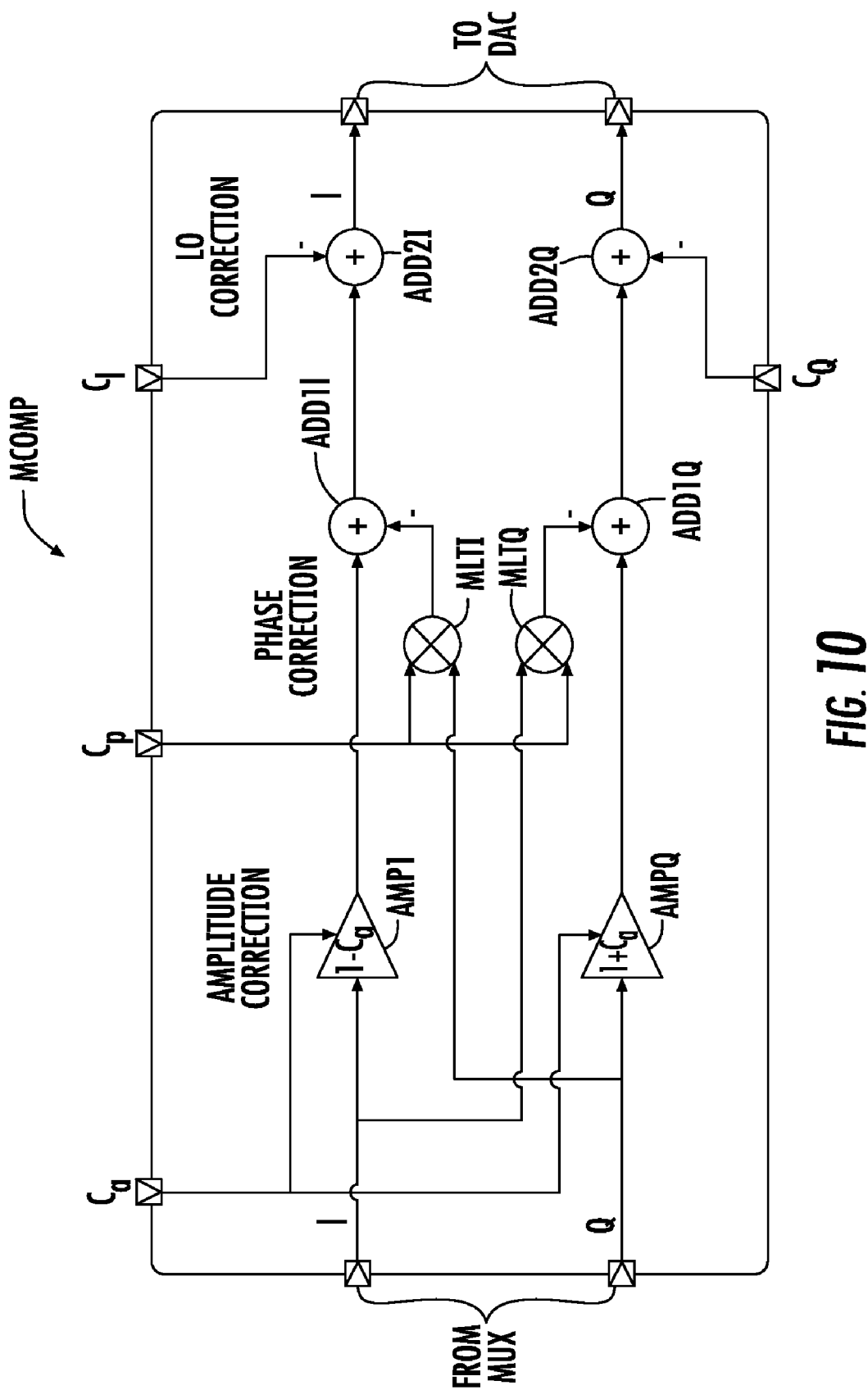
FIG. 10 schematically illustrates an embodiment of compensation module, according to the present invention.

Moreover, the element creating the transposition signal leak is mainly the frequency transposition stage itself, this leak provoking an undesirable ray in the center of the radio frequency band. Generally, the system SYS comprises, for example, calibration means including estimation means configured to estimate compensation parameters representative of the imperfections and compensation means MCOMP configured to take into account these parameters in the transmission subsystem. The compensation means MCOMP, of which an exemplary embodiment is illustrated in FIG. 10, and which may be explained in more detail hereinbelow, are, for example, incorporated in the digital part of the processing subsystem upstream of the digital-to-analog converters.

Moreover, the estimation means include generation means GEN coupled to the transmission subsystem upstream of the elements originating the imperfections. The estimation means also include determination means MDET coupled downstream of the transposition stage ETR1 to receive the signal SRF and directly deliver from this signal an approximate value for each compensation parameter. The structure of these means MDET may be described in more detail hereinbelow.

The generation means are configured to deliver a reference signal $t_n$ having a reference frequency. In practice, this reference signal is a purely complex tone having the reference frequency. This reference signal is delivered, in the present exemplary embodiment, upstream of the compensation means MCOMP through the intermediary of a controllable multiplexer MUX.

It is worth noting here that, although the compensation means MCOMP have been represented in this example in the digital part upstream of the digital-to-analog converter stage, they could be positioned in the analog part of this transmission subsystem. However, in the latter case, the intrinsic imperfections of the compensation means may be taken into account in the estimation-compensation process, unless these intrinsic imperfections are small compared to those of the subsystem and it is possible to disregard them in certain applications. Thus, it is preferable to place the compensation means in the digital part of the transmission subsystem. Control means MCM produced, for example, in software form, and incorporated, for example, in the baseband processor PBB, control the multiplexer MUX.

Figure 3:
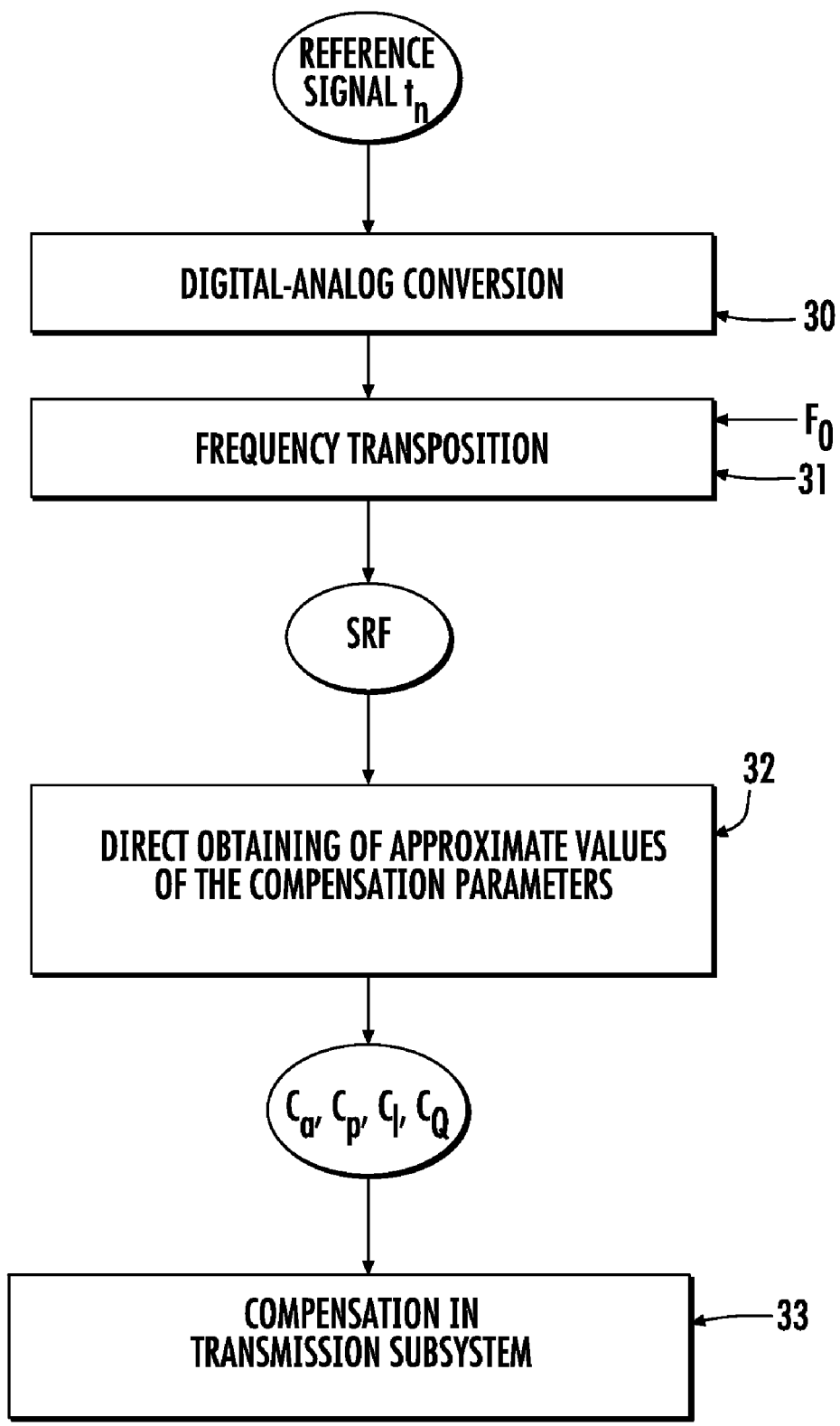
FIGS. 3 to 5 illustrate flowcharts for different implementations of a method, according to the present invention.

As illustrated also in FIG. 3, when the multiplexer MUX is controlled so as to authorize the delivery in the transmission subsystem of the reference signal $t_n$, the result is, after in particular digital-to-analog converter 30 and frequency transposition 31 in the stage ETR1, a resultant reference signal SRF. This signal SRF is a radio frequency signal. Also, it is from this resultant signal SRF, obtained downstream of the frequency transposition stage ETR1, that the approximate values of the compensation parameters $C_a$, $C_p$, $C_I$ and $C_Q$ may be directly obtained (step 32). These approximate values are obtained directly, that is, without there being a need to perform an iterative process. Similarly, such a direct obtaining is distinguished from an indirect obtaining of the prior art in which it was first necessary to determine the envelope of the power of the signal SRF before being able to determine the compensation parameters. The compensation parameters are then delivered to the means MCOMP (step 33) to produce the desired compensation.

Figure 2:
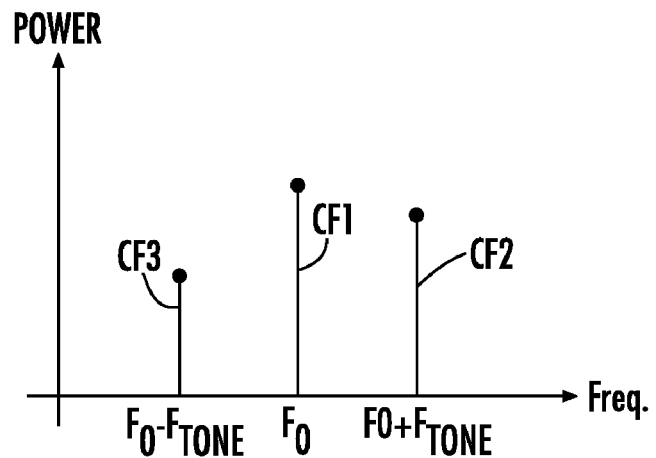
FIG. 2 illustrates an exemplary frequency spectrum of a resultant reference signal in the system of FIG. 1.

As illustrated in FIG. 2, the resultant radio frequency reference signal SRF, which has been subjected to a transposition at the frequency $F_0$, for example, a frequency between 2 GHz and 5 GHz, includes a first frequency component CF1 at the frequency $F_0$, a second frequency component CF2, which has the frequency $F_0+F_{tone}$, where $F_{tone}$ designates the frequency of the reference signal $t_n$. This component CF2 effectively represents the reference signal transposed to the frequency $F_0$. Finally, the signal SRF includes a third component CF3, having the frequency $F_0-F_{tone}$, and which is the image component of the component CF2. The generation of the reference signal $t_n$ can be performed by using a modulator OFDM in combination with inverse Fourier transform means IFFT present in the baseband processor PBB. As a variant, it is possible to use a dedicated generation block.

Figure 4:
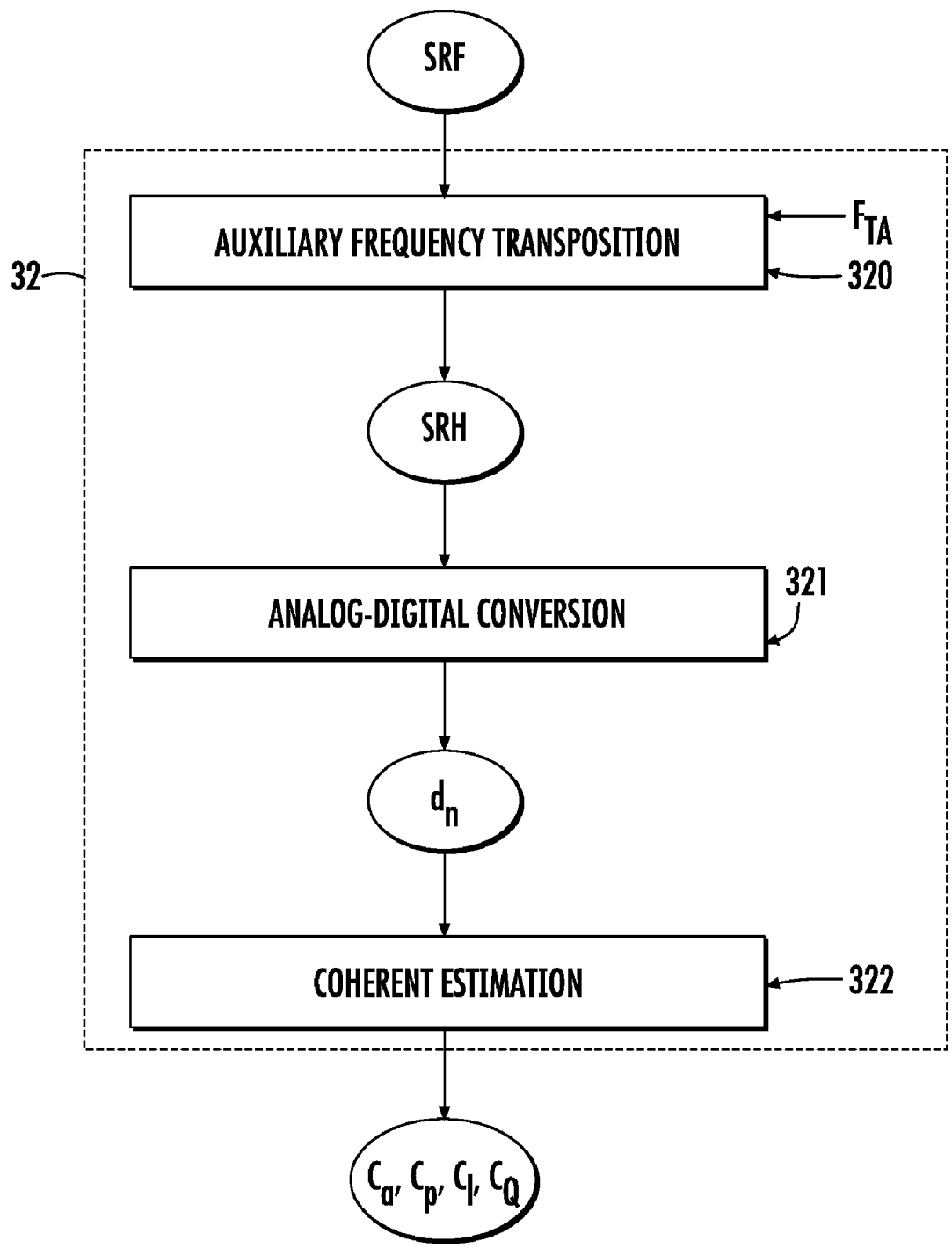

Referring now more particularly to FIG. 4, it can be seen that the obtaining of the set of parameters $C_a$, $C_p$, $C_I$ and $C_Q$ includes, in one particular implementation, a non-quadratic downward auxiliary frequency transposition 320 performed on the signal SRF with a transposition frequency $F_{T4}$. The auxiliary transposition is non-quadratic in that it is not performed with two transposition signals in phase quadrature but with a single auxiliary transposition signal. The resultant transposed signal SRH is subjected in particular to an analog-to-digital conversion 321. The digital signal $d_n$ obtained in this way may then be subjected to a coherent estimation 322 which may make it possible to extract the set of compensation parameters.

Figure 6:
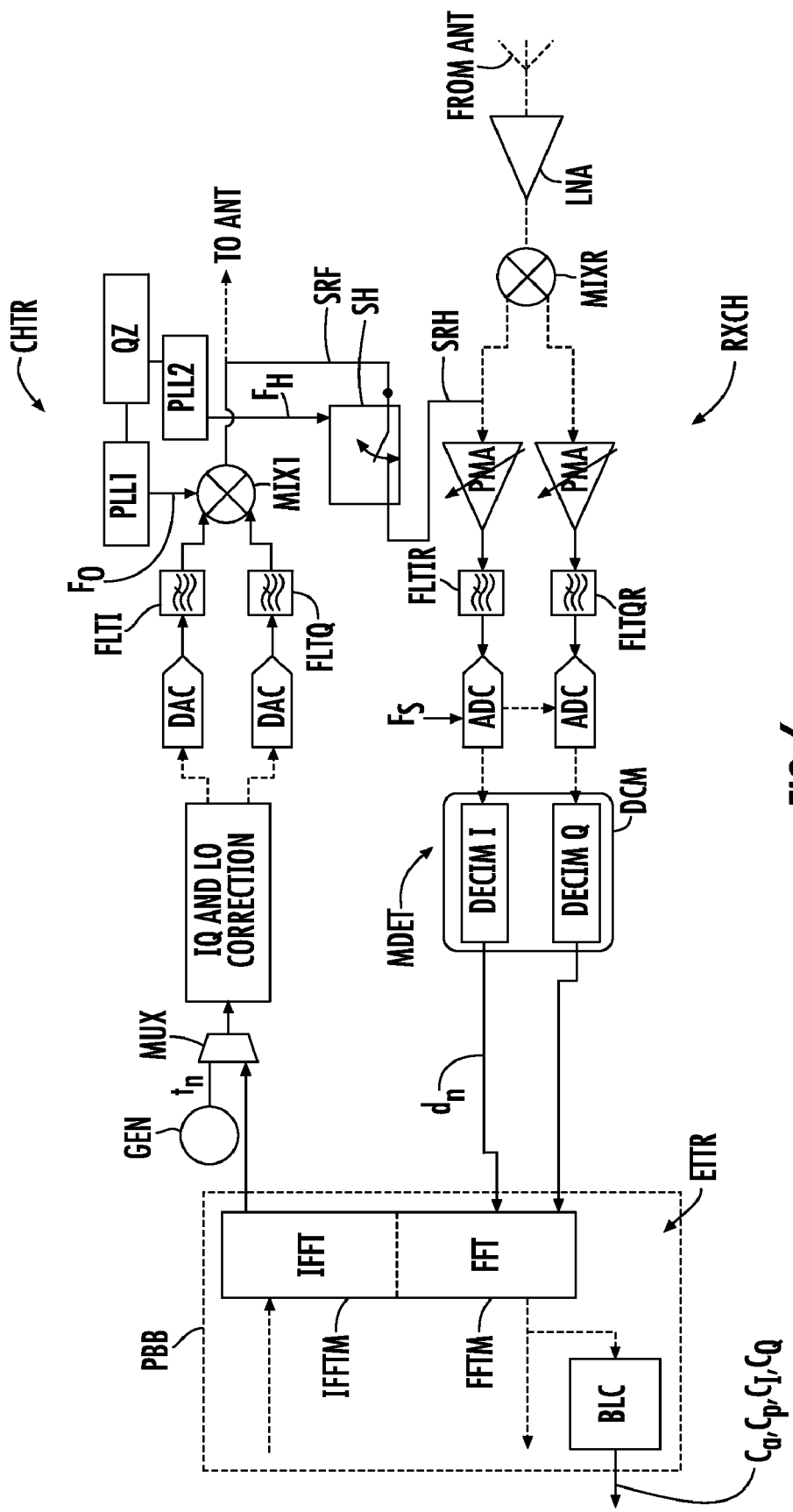
FIG. 6 is a detailed schematic diagram of another embodiment of a processing system, according to the present invention.

FIG. 6 illustrates a first embodiment of the determination means MDET, and more particularly, of the means making it possible to perform the auxiliary frequency transposition 320. More particularly, these means here include a sampler-holder SH controlled by a control signal having the frequency $F_H$ and obtained from a phase-locked loop PLL2. The use of a sampler-holder SH is particularly advantageous notably in terms of hardware, because the loop PLL2 can be the same as that used to generate certain signals of the digital part of the transmission subsystem CHTR. As an indication, the frequency $F_H$ can be of the order of 26 MHz, the quartz crystal QZ controlling the loops PLL1 and PLL2 having, for example, a frequency of 52 MHz.

Figure 7:
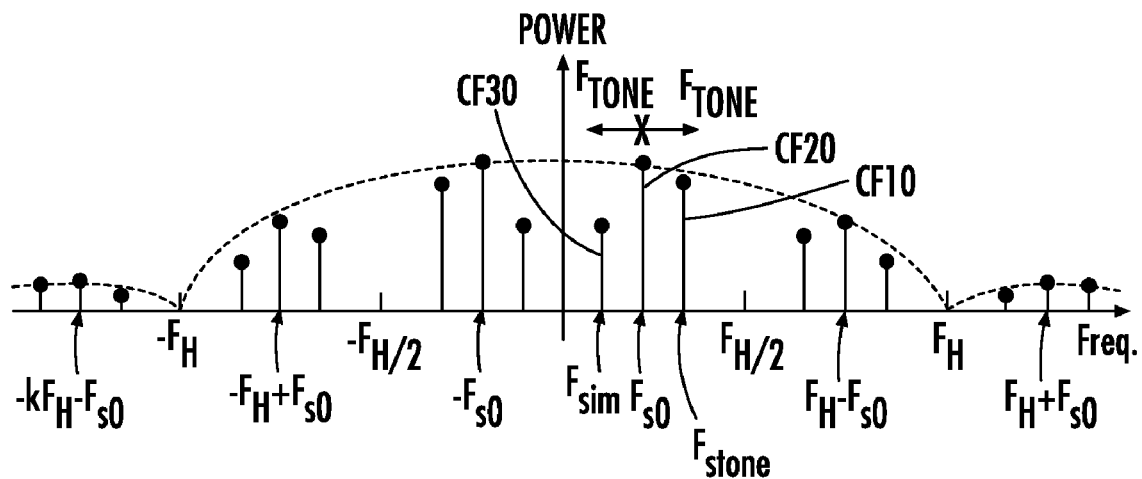
FIG. 7 schematically illustrates a spectral distribution of a signal after sampling and holding in the system of FIG. 1.

FIG. 7 illustrates an exemplary frequency spectrum of the signal SRH obtained from the sampler-holder SH. As can be seen in FIG. 7, this frequency spectrum results from the combined effect of the sampling aliasing of the radio frequency spectrum and of the effect of sine cardinal filtering (sin c) of the holding operation.

In practice, this frequency spectrum includes a repetition of a trident of three frequency components CF10, CF20 and CF30. Each trident includes a first frequency component CF10, which is representative of the echo of the reference signal, a second frequency component CF20, which is representative of an echo of the transposition signal leaks, and a third frequency component CF30, which is the image of the first frequency component CF10.

So as to minimize the impact of the sine cardinal function resulting from the sampling and holding, it is preferable to choose a trident in which the frequency component CF10 has a frequency $F_{stone}$ (equal to $F_{s0}+F_{tone}$) that is small compared to the frequency $F_H$ controlling the sampler-holder. It is then possible to choose, for example, the trident CF10, CF20, CF30 illustrated in FIG. 7 having a frequency $F_{stone}$ of the component CF10 less than $F_H/2$. The frequency of the second frequency component CF20 is equal to $F_{s0}$, and the frequency of the third frequency component is equal to $F_{sim}$ ($F_{sim}=F_{s0}-F_{tone}$).

Moreover, the first transposition frequency $F_0$ is linked to the frequency $F_{s0}$ of the second frequency component CF20 by the relation (I) hereinbelow:

$$F_{s0}=F_0-k_0F_H \quad (I)$$

in which $k_0$ is an integer.

It is, moreover, preferable to choose a frequency $F_{tone}$ that is sufficiently high to minimize the impact of phase noise. This phase noise is associated with the characteristics of the phase-locked loop used. Those skilled in the art may be able to choose the frequency $F_{tone}$ as a function of the characteristics of this phase-locked loop. As an indication, a frequency $F_{stone}$ equal to 1 MHz could be chosen.

Moreover, when, as is the case in FIG. 6, the determination means MDET use a part of the reception subsystem RXCH of the appliance APP, for example, the reception channel I, it is preferable for the frequency $F_{sim}$ of the image frequency component CF30 to be sufficiently distant from the zero frequency to minimize the impact of the phase noise on the DC current level present on this reception channel. It is also possible to choose, for example, $F_{s0}$ and $F_{tone}$ so as to obtain a frequency $F_{sim}$ of the order of 1 MHz.

Similarly, and notably in the case where, as in FIG. 6, a part of the means of the reception subsystem is used, the frequencies $F_{s0}$, $F_0$, and $F_H$ may preferably be chosen so that the frequency $F_{s0}$ is non-zero so as not to be superimposed with the DC level. Furthermore, to avoid a degradation of the signal in the analog-to-digital converter situated downstream of the sampler-holder, given the spectral aliasing, a frequency $F_{s0}$ and a frequency $F_{tone}$ may advantageously be chosen such that $|F_{s0}|+F_{tone}$ is less than $F_s$, where $F_s$ designates the sampling frequency of the analog-to-digital converter.

Finally, to avoid an overlap with the negative frequencies, a frequency $F_{s0}$ may advantageously be chosen to be greater than the frequency $F_{tone}$ for the case where the frequency $F_H$ is less than the frequency $F_0$ and a frequency $F_{s0}$ less than the opposite of the frequency $F_{tone}$ for the case where the frequency $F_H$ is greater than the frequency $F_0$.

After mathematical developments and simplifications using first order approximations, it is shown that the signal SRH(t) is, in the range $[0,F_H/2]$, defined as a first approximation by the formula (II):

$$G_{RX}(A(t)+B(t)+C(t)) \quad (II)$$

in which GRX designates the gain of the means positioned downstream of the sampler-holder SH and in which A(t), B(t), and C(t) are respectively defined by the formulae (III), (IV), and (V).

$$2G_{Tx}\cos((\bar{\omega}_{stone})t) \quad (III)$$

$$G_{Tx}((\epsilon-2C_a)+j(\phi-2C_p))e^{j\bar{\omega}_{sim}t} \quad (IV)$$

$$A_{LO}e^{j\bar{\omega}_{s0}t} \quad (V)$$

In these formula, $G_{Tx}$ designates the gain of the transmission subsystem, $\epsilon$ designates the gain mismatch ($\epsilon=(G_I/G_Q)-1$ where $G_I$ and $G_Q$ respectively designate the gains of the I and Q channels), $\phi$ designates the phase mismatch, $A_{LO}$ is a complex number representing the combination of the transposition signal leak and its precompensation in the compensation means.

Moreover:

$$\bar{\omega}_{s0}=2\pi F_{s0}$$

$$\omega_{stone}=\bar{\omega}_{s0}+2\pi F_{tone}$$

$$\omega_{sim}=\bar{\omega}_{s0}-2\pi F_{tone}$$

As indicated hereinabove, and as illustrated in FIG. 6, the signal SRH may be processed by using a part of the means of the reception subsystem RXCH. More specifically, this reception subsystem RXCH includes a low-noise amplifier LNA followed by a frequency transposition stage from which the two I and Q processing channels leave in reception. Each processing channel here includes a variable gain amplifier PMA followed by a high-pass filter FLTIR (for the I channel) and FLTQR (for the Q channel). Each of these filters is followed by an analog-to-digital conversion stage ADC followed by decimation means DCM, here forming, although this is not essential, an analog-to-digital conversion stage of the delta-sigma type.

A digital signal $d_n$ corresponding to the signal SRH is delivered to the I channel at the output of the decimator DCM. This signal may be analyzed for each of the three frequency components CF10, CF20 and CF30 by using a complex correlator or, as illustrated in FIG. 6, fast Fourier transform means FFT that already exist generally in the baseband processor PBB. In this respect, it is preferable, for a more effective processing, for the frequencies $F_{s0}$, $F_{sim}$, $F_{stone}$ to correspond to frequencies actually processed by the means FFT.

Figure 5:
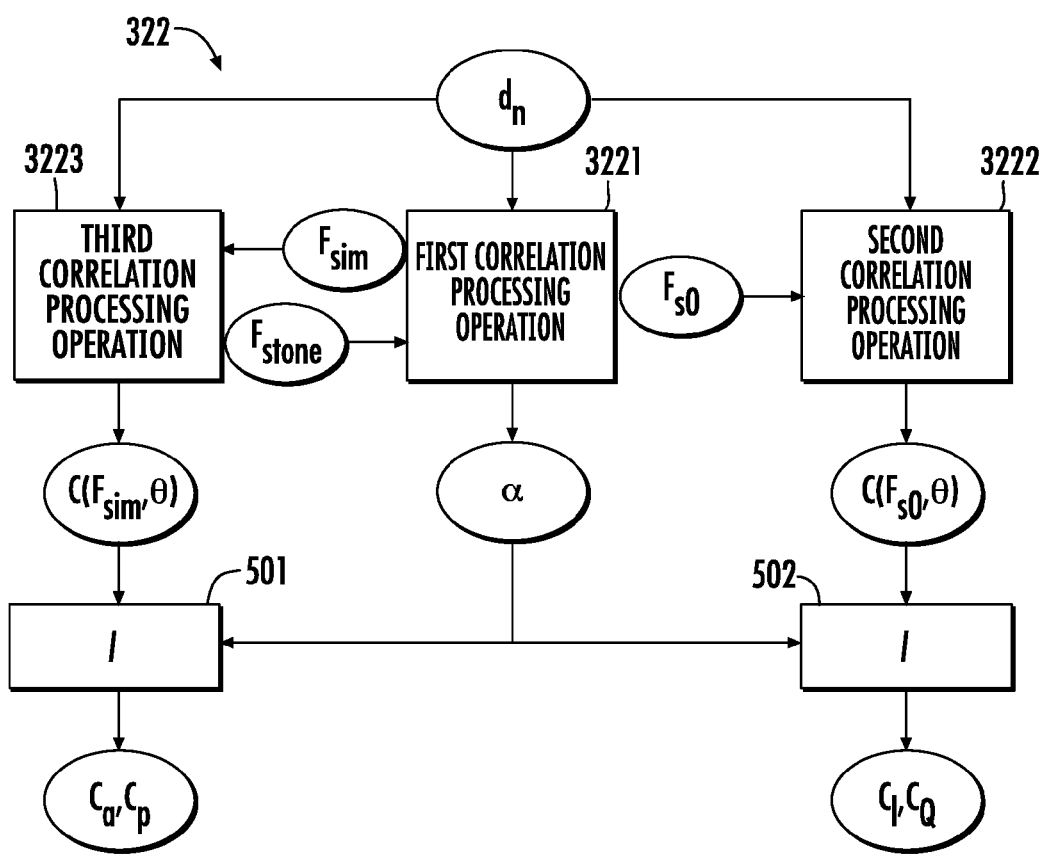

As illustrated in FIG. 5, the coherent estimation 322 may include three correlation processing operations, namely a first correlation processing operation 3221, a second correlation processing operation 3222 and a third correlation processing operation 3223. These correlation processing operations may make it possible to perform a coherent estimation of the compensation parameters by taking into account the phase $\theta$ of the digital signal $d_n$. Each correlation processing operation that involves a frequency $f_c$ and the phase parameter $\theta$ is defined by the formula (VI) below:

$$c(f_c, \theta) = \sum_{n=0}^{N} d_n \times (e^{j2\pi f_c T_s n + \theta}) \quad (VI)$$

In this formula, $T_s$ designates the sampling period of the analog-to-digital converter ADC, N designates the number of samples $d_n$ of the digital signal that are used to perform the correlation, and j is the complex number, the square of which is equal to $-1$. The product $T_sN$ is equal to the inverse of the frequency of the correlator. It should be noted here that, in the formula (VI), the phase $\theta$ has been represented in the complex exponential. That the, it could also be represented in the signal $d_n$.

The first correlation processing operation 3221, which involves the frequency $F_{stone}$, makes it possible to estimate the product $2G_{Rx}G_{Tx}$ and the parameter $\theta$. It is a kind of "channel" estimation. The result α of this first correlation processing operation is therefore defined by the formula (VII) hereinbelow:

$$\alpha = c(F_{stone}, \theta) \quad \text{(VII)}$$

In other words, the frequency $f_c$ of the formula (VII) is here taken to be equal to the frequency $F_{stone}$. It can be seen from the formula (VII) and (VI) that α is equal to $2G_{Rx}G_{Tx}e^{j\theta}$. The second correlation processing operation 3222 involves the frequency $F_{s0}$. A second correlation result $c(F_{s0}, \theta)$ is obtained. The parameter $A_{LO}$ is then defined by the formula (VIII) hereinbelow:

$$A_{LO} = \frac{2c(F_{s0}, \theta)}{\alpha} \quad \text{(VIII)}$$

This parameter $A_{LO}$ is in fact a complex number that can be expressed according to the formula (IX) hereinbelow:

$$A_{LO} = C_I + jC_Q \quad \text{(IX)}$$

in which $C_I$ is equal to the real part of the complex number $A_{LO}$ and $C_Q$ is equal to the imaginary part of the complex number $A_{LO}$.

The compensation parameter values $C_I$ and $C_Q$ can therefore easily be deduced therefrom based on the value of $A_{LO}$. It should be noted here that the determination of a ratio, to within the coefficient 2, between the second correlation result and the first correlation result α, makes it possible to directly determine the parameter $A_{LO}$ without accurately knowing the phase θ and the gains $G_{Rx}$ and $G_{Tx}$, while taking into account this phase θ. However, it is important for these two correlation processing operations to be performed on the same phase of the digital signal, so that the ratio does not lead to a false value.

By performing these correlation processing operations in direct Fourier transform means, it automatically becomes possible to perform such a coherent estimation, i.e., to perform these correlation processing operations on the same phase of the digital signal, in this case, on the same samples of the digital signal. The ratio calculated in the step 502 is in practice calculated in a computation block BLC (FIG. 6) implemented, for example, as software within the baseband processor PBB. As a variant, this block BLC could be produced using logic circuits.

In the case, where there is a desire to also determine the parameters $C_a$ and $C_p$, a third correlation processing operation is performed that involves the frequency $F_{sim}$ and supplies a third correlation result $c(F_{sim}, \theta)$. The ratio of this third correlation result, to be within the ratio 2, to the result a of the first correlation processing operation, supplies another complex expression defined by the formula (X) hereinbelow:

$$(\varepsilon - 2C_a) + j(\phi - 2C_p) = \frac{2c(F_{sim}, \theta)}{\alpha} \quad \text{(X)}$$

In this formula, the real part of the complex expression represents the gain mismatch of the system for a given initial value of the parameter $C_a$, whereas the imaginary part of this expression represents the phase mismatch for a given initial value of the parameter $C_p$. To compensate for this mismatch, it is then necessary to cancel the real part and the imaginary part of this expression defined in the left-hand part of the formula (X) hereinabove.

Also, if a zero initial value is used as the starting point for the parameters $C_a$ and $C_p$, then the cancellation of the real and imaginary parts of the formula (X) hereinabove amounts to choosing, for the effective values of the parameters $C_a$ and $C_p$, half the value of the real part and half the value of the imaginary part, respectively. Here also, the only necessary condition is to perform the first and third correlation processing operations on the same phase of the digital signal, which is effectively the case when direct Fourier transform means are used.

Obviously, depending on the compensation parameters that are effectively to be calculated, the first and the second correlation processing operations, or the first and the third correlation processing operations, or even all three correlation processing operations may be performed as required. It may be noted here that the calculation of the compensation coefficients results from first order equations because of the use of the channel estimation, thereby allowing for a coherent estimation. This is therefore distinguished from the prior art, which uses second order equations (quadratic estimations).

The calculated parameters $C_a$, $C_p$, $C_I$, $C_Q$ are then injected into the compensation means MCOMP, one embodiment of which is represented in FIG. 10. More specifically, the signal on the I channel is subjected to an amplitude correction in an amplifier ANPI of gain $1 - C_a$, whereas the signal on the Q channel is subjected to an amplitude correction in an amplifier ANPQ of gain $1 + C_a$. The signals on the I and Q channels are both multiplied by the coefficient $C_p$ before being injected in a crossed manner into the I and Q channels within subtraction modules ors ADD1I and ADD1Q. The phase correction is thus produced.

Figure 8:
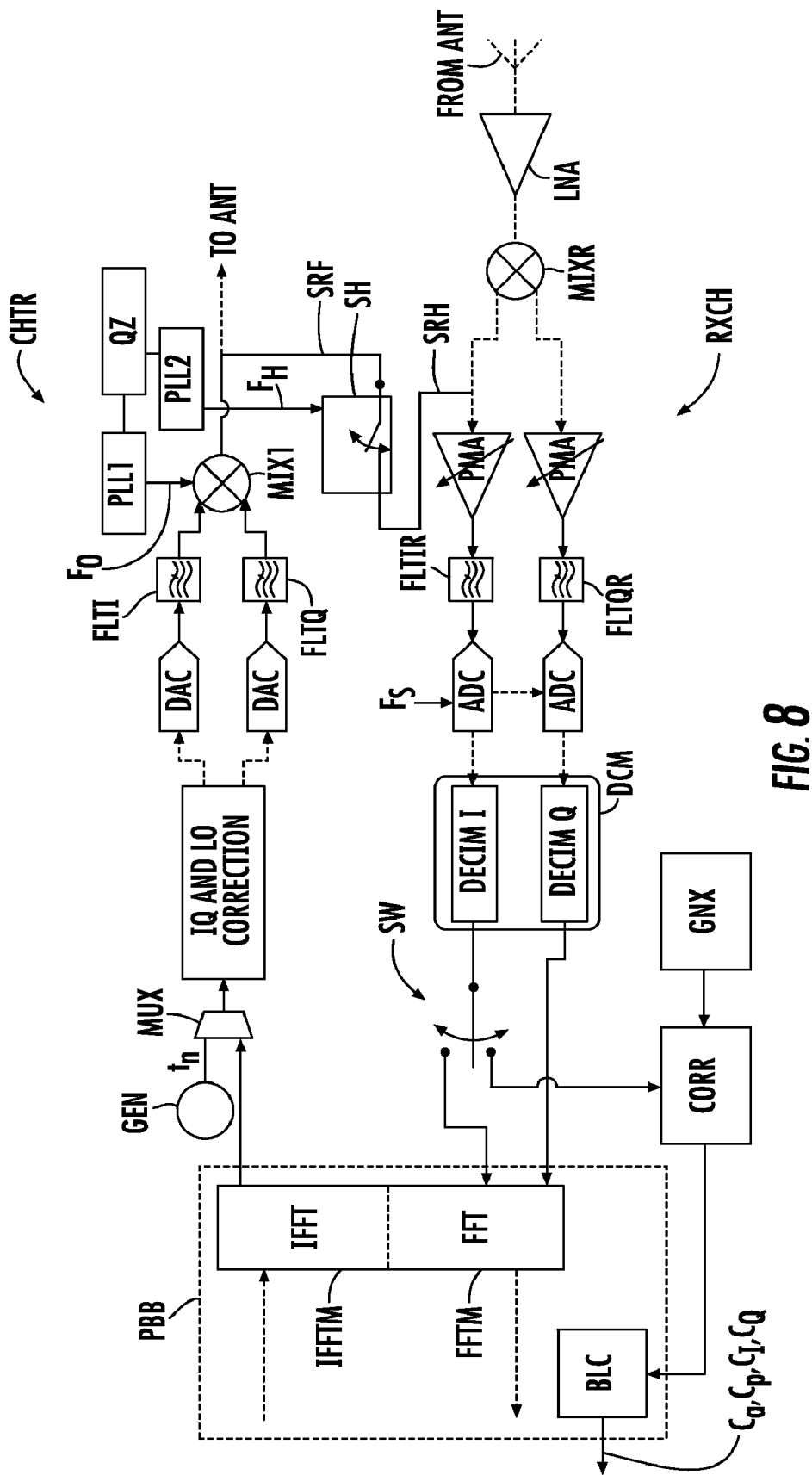
FIGS. 8 and 9 are schematic diagrams of other embodiments of the system, according to the present invention.
Figure 9:
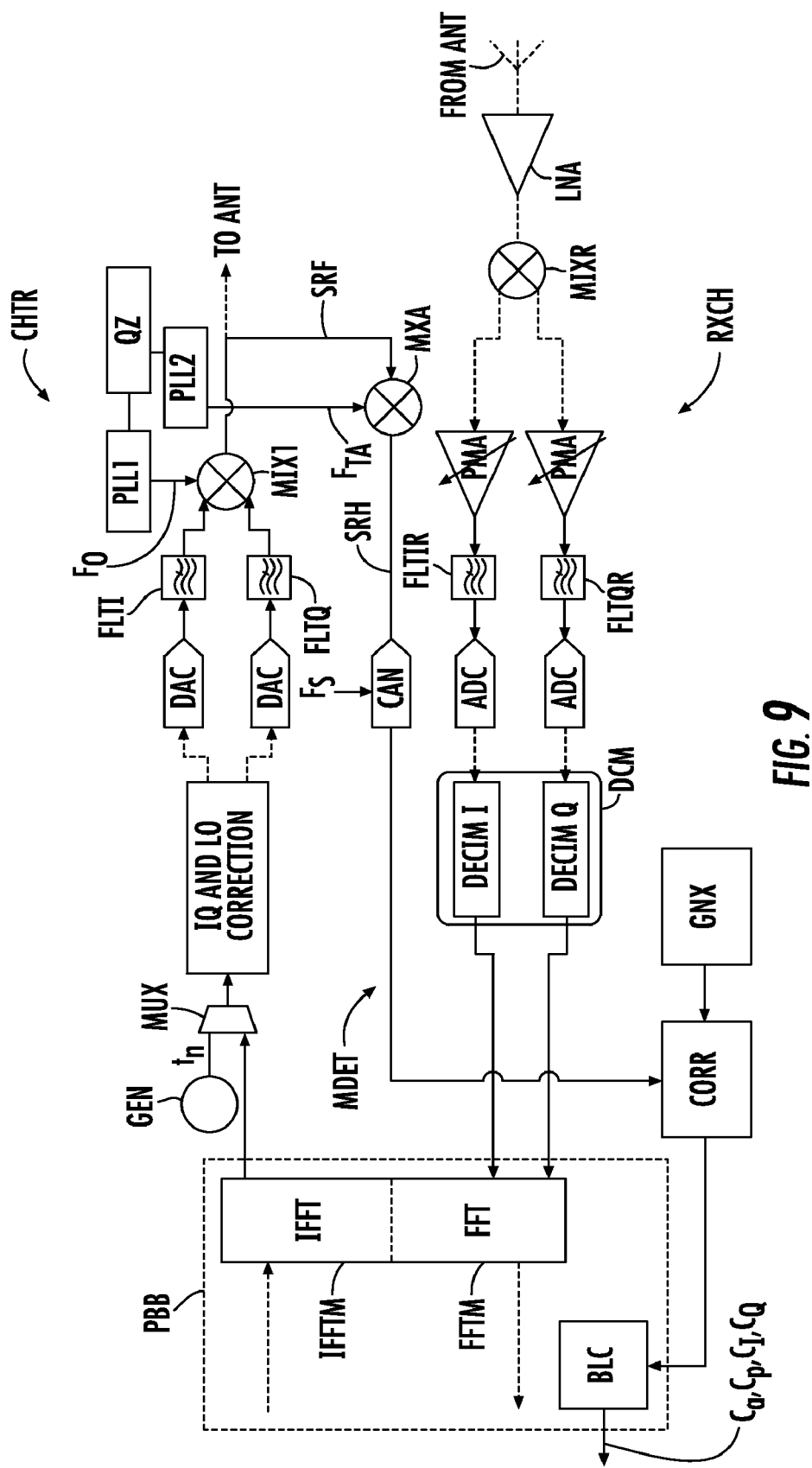

Finally, the transposition leak signal correction, by means of the parameters $C_I$, $C_Q$ is produced in two subtraction modules ADD2I and ADD2Q. Instead of performing the correlation processing operations within direct Fourier transform means FFT, it is possible, as illustrated in FIG. 8, to use a digital correlator CORR, which may perform the calculation of the different correlation results in accordance with the formulas (VI), (VII), (VIII), (IX) and (X). This correlator is associated with an auxiliary generator GNX, which may generate the complex exponentials that have the frequencies $F_{s0}$, $F_{stone}$ and $F_{sim}$.

Obviously, a switch SW, being controlled by the control means MCM, may make it possible to link the output of the decimator DCM to the input of the correlator in calibration mode or even to the Fourier transform means FFT in normal operating mode.

To produce a coherent estimation, these correlations may be performed as indicated previously, with the same phase of the digital signal, i.e. in this case, for example, on the same samples of the digital signal $d_n$. In this respect, it is possible to provide a buffer memory at the input of the correlator, which may store the samples of the digital signal on which the different correlation processing operations may be performed. If the size of the buffer memory is a multiple of the three frequencies $F_{stone}$, $F_0$, and $F_{sim}$ concerned, then it is possible to perform these correlation processing operations sequentially.

Whereas, in the embodiments that have just been described, the means MDET use a part of the reception subsystem RXCH, it is quite possible to consider using totally separate means to perform in particular the analog-to-digital conversion of the signal SRH. Similarly, instead of using a sampler-holder SH, it is possible to use an auxiliary transposition stage or mixer of conventional structure, which may perform a non-quadratic downward frequency transposition at the transposition frequency $F_{TA}$ so as to deliver the signal SRH to the analog-to-digital converter CAN.

Here too, and although it is not essential, a frequency $F_{s0}$ and a frequency $F_{tone}$ may preferably be chosen so that the sum of the absolute value of the frequency $F_{s0}$ and of the frequency $F_{tone}$ is less than the sampling frequency Fs of the analog-to-digital converter CAN so as to minimize the degradation of the signal in the converter given the spectral aliasing. An auxiliary transposition frequency may also preferably be chosen to be close to the first transposition frequency $F_0$ so as to perform a non-quadratic downward conversion at a low intermediate frequency. An auxiliary transposition frequency $F_{TA}$ may also preferably be chosen that is different from the frequency $F_0$ so as to avoid having a superimposition of the second frequency component CF20 with the DC current level of the determination means MDET (mixer MXA in particular).

Although the calibration processing operation that has just been described supplies approximate values of the set of compensation parameters, it is quite possible, if there is a desire to refine the accuracy of these compensation parameters and/or to take into account temperature variations, for example, to perform several successive calibration processing operations each time taking as the initial value for the parameters $C_a$, $C_p$, $C_I$ and $C_Q$ the parameters calculated in the preceding calibration. The management of these different calibrations is performed by monitoring means MCTL (FIG. 1) that can also be incorporated in the processor PBB.

It has been seen that, according to one aspect, a set of compensation parameters can be extracted on the basis of a single measurement of the signal SRF. This is therefore distinguished in particular from the extractions of the prior art using quadratic minimum searches (by the least squares method for example), or even indirect measurements (quadratic envelope detection measurements).

Compared to the iterative minimum searches, the disclosure is significantly improved in terms of performance and latency, since just one iteration is necessary to obtain a set of parameters. In the case of a quadratic detection, five to nine detections were generally needed to provide a set of compensation parameters. The disclosure methods can therefore be five to nine times faster than such methods. It is thus possible to perform a greater number of calibrations with different frequencies $F_{tone}$.

The exemplary transmission subsystem architecture described hereinabove is not limiting. Indeed, other so-called "digital radio" architectures provide a merging of the digital-analog converters and of the frequency transposition stage. The reconstruction filtering stage (anti-aliasing) is then situated after the frequency transposition stage. Such architectures are also subject to the defects stated hereinabove.

That which is claimed:

1. A method for processing defects in a radio frequency (RF) transmission subsystem from elements therein, the defects including at least one of a mismatch between two channels in phase quadrature in the RF transmission subsystem and a leaking transposition signal from a first frequency transposition stage of the RF transmission subsystem and having a first transposition frequency, the method comprising:
    calibration processing including estimating compensation parameters representative of the defects, the estimating comprising
       delivering, into the RF transmission subsystem upstream of the elements creating the defects, a reference signal having a reference frequency,
       obtaining, downstream of the first frequency transposition stage, a resultant reference signal, and
       obtaining, from the resultant reference signal, an approximate value for each compensation parameter, the obtaining of the approximate value comprising a downward auxiliary frequency transposing of the resultant reference signal with an auxiliary transposition frequency, being different from the first transposition frequency, to provide a transposed reference signal comprising a first frequency component representative of an echo of the reference signal and having a first frequency, and a second frequency component representative of an echo of the leaking transposition signal and having a second frequency; and
    compensating for the defects by at least injecting the approximate values into the RF transmission subsystem.

2. The method according to claim 1 wherein the obtaining of the approximate values of the compensation parameters comprises:
    analog-to-digital converting of the transposed reference signal to provide a digital signal; and
    coherent estimating of the approximate values based upon the phase of the digital signal.

3. The method according to claim 2 wherein the coherent estimating of the approximate values of the compensation parameters includes:
    a first processing for correlating the digital signal with a complex exponential having the first frequency;
    a second processing for correlating the digital signal with a complex exponential having the second frequency; and
    determining a ratio between a result of the first processing and a result of the second processing operation.

4. The method according to claim 3 wherein the first processing and the second processing are performed with the phase of the digital signal.

5. The method according to one of claim 3 wherein a sum of the reference frequency and an absolute value of the second frequency is less than a sampling frequency of the analog-to-digital converting.

6. The method according to one of claim 3 wherein the downward auxiliary transposing includes sampling and holding of the resultant reference signal.

7. The method according to claim 6 wherein the sampling and holding operates at a control frequency; wherein the control frequency is greater than the first frequency; and wherein a difference between the first transposition frequency and the second frequency is an integer multiple of the control frequency.

8. The method according to claim 2 wherein the transposed reference signal includes a third frequency component being an image of the first frequency component and having a third frequency; and wherein the coherent estimating of the approximate values of the compensation parameters includes:
    a first processing for correlating the digital signal with a complex exponential having the first frequency;
    a third processing for correlating the digital signal with a complex exponential having the third frequency, the first processing and the third processing being performed with the phase of the digital signal; and
    determining a ratio between a result of the third processing operation and a result of the first processing.

9. The method according to claim 1 wherein the estimating of the compensation parameters is performed during a period of absence for transmission in the RF transmission subsystem.

10. The method according to claim 1 further comprising a second calibration processing, the second calibration processing being identical to the first calibration processing and being performed thereafter.

11. A method for processing defects in a radio frequency (RF) transmission subsystem comprising:
calibration processing including estimating compensation parameters representative of the defects, the estimating comprising
delivering a reference signal having a reference frequency,
obtaining a resultant reference signal, and
obtaining an approximate value for each compensation parameter, the obtaining of the approximate value comprising downward auxiliary frequency transposing of the resultant reference signal with an auxiliary transposition frequency to provide a transposed reference signal comprising a first frequency component representative of an echo of the reference signal and having a first frequency, and a second frequency component; and
compensating for the defects by at least injecting the approximate values into the RF transmission subsystem.

12. The method according to claim 11 wherein the defects include at least one of a mismatch of two channels in phase quadrature of the RF transmission subsystem and a leaking transposition signal from a first frequency transposition stage of the RF transmission subsystem; wherein the transposition signal of the first frequency transposition stage has a first transposition frequency; wherein the auxiliary transposition frequency is different from the first transposition frequency; and wherein the obtaining of the approximate values of the compensation parameters comprises:
analog-to-digital converting of the transposed reference signal to provide a digital signal; and
coherent estimating of the approximate values based upon the phase of the digital signal.

13. The method according to claim 12 wherein the second frequency component is representative of an echo of the leaking transposition signal and having a second frequency; and wherein the coherent estimating of the approximate values of the compensation parameters includes:
a first processing for correlating the digital signal with a complex exponential having the first frequency;
a second processing for correlating the digital signal with a complex exponential having the second frequency; and
determining a ratio between a result of the first processing and a result of the second processing operation.

14. A system for processing defects in a radio frequency (RF) transmission subsystem from elements therein, the defects including at least one of a mismatch of two channels in phase quadrature of the RF transmission subsystem and a leaking transposition signal from a first frequency transposition stage of the RF transmission subsystem and having a first transposition frequency, the system comprising:
a calibration module including an estimating module configured to estimate compensation parameters representative of the defects and comprising
a generator to be coupled to the RF transmission subsystem upstream of the elements creating the defects and configured to provide a reference signal having a reference frequency, and
a determination module to be coupled downstream of the first frequency transposition stage for receiving a resultant reference signal and configured to provide from the resultant reference signal an approximate value for each compensation parameter, said determination module comprising an auxiliary transposition module to be coupled to an output of the RF transmission subsystem and configured to perform a downward auxiliary frequency transposition of the resultant reference signal with an auxiliary transposition frequency, being different from the first transposition frequency, and to provide a transposed reference signal comprising a first frequency component representative of an echo of the reference signal and having a first frequency, and a second frequency component representative of an echo of the leaking transposition signal and having a second frequency; and
a compensation module configured to receive the approximate values and to use the approximate values in the RF transmission subsystem.

15. The system according to claim 14 wherein said determination module includes:
an analog-to-digital converter to be coupled to the output of said auxiliary transposition module and configured to deliver a digital signal; and
a processor to be coupled to the output of said analog-to-digital converter and configured to perform a coherent estimation of the approximate values based upon a phase of the digital signal.

16. The system according to claim 15 wherein said processor is configured to perform a coherent estimation of the approximate values of the compensation parameters representative of the leaking transposition signal from the first frequency transposition stage of the RF transmission subsystem; and wherein said processor includes:
a first correlation module configured to perform a first correlation processing on the digital signal with a complex exponential having the first frequency;
a second correlation module configured to perform a second correlation processing on the digital signal with a complex exponential having the second frequency; and
a computation module configured to calculate a ratio between a result of the second correlation processing and a result of the first correlation processing.

17. The system according to claim 16 wherein the first correlation processing and the second correlation processing are performed with the phase of the digital signal.

18. The system according to claim 16, wherein said processor further includes a digital correlator.

19. The system according to claim 16 wherein said processor includes a direct Fourier transform module.

20. The system according to claim 16 wherein a sum of the reference frequency and an absolute value of the second frequency is less than a sampling frequency of said analog-to-digital converter.

21. The system according to claim 16 wherein said auxiliary transposition module includes a sampler-holder module.

22. The system according to claim 21 wherein a control frequency of said sampler-holder module is greater than the first frequency; and wherein the difference between the first transposition frequency and the second frequency is an integer multiple of the control frequency of the sampler-holder module.

23. The system according to claim 15 wherein the transposed reference signal includes a third frequency component being an image of the first frequency component and having a third frequency; wherein said processor is configured to perform a coherent estimation of the approximate values of the compensation parameters representative of the mismatches of the two channels in phase quadrature of the RF transmission subsystem; and wherein said processor comprises:

a first correlation module configured to perform a first correlation processing on the digital signal with a complex exponential having the first frequency;
a third correlation module configured to perform a third correlation processing on the digital signal with a complex exponential having the third frequency, the first processing and the third processing being performed with the phase of the digital signal; and
a computation module configured to calculate a ratio between a result of the third correlation processing and a result of the first correlation processing.

24. The system according to claim 14 further comprising a controller configured to activate said estimating module during a period of absence of transmission in the RF transmission subsystem.

25. The system according to claim 14 further comprising a monitoring module configured to activate said calibration module.

26. A radio frequency (RF) transmission subsystem of a wireless communications device, the RF transmission subsystem comprising:
a first frequency transposition stage including elements creating defects including at least one of a mismatch of two channels in phase quadrature and a leaking transposition signal having a first transposition frequency; and
a device for processing the defects and comprising
a calibration module configured to estimate compensation parameters representative of the defects and comprising
a generator to be coupled upstream of the elements and configured to provide a reference signal having a reference frequency, and
a determination module to be coupled downstream of said first frequency transposition stage for receiving a resultant reference signal and configured to provide an approximate value for each compensation parameter, said determination module comprising an auxiliary transposition module configured to perform a downward auxiliary frequency transposition of the resultant reference signal with an auxiliary transposition frequency, being different from the first transposition frequency, and provide a transposed reference signal comprising a first frequency component representative of an echo of the reference signal and having a first frequency, and a second frequency component representative of an echo of the leaking transposition signal and having a second frequency, and
a compensation module configured to receive the approximate values and to use the approximate values.

27. The RF transmission subsystem according to claim 26 wherein said first frequency transposition stage and said device for processing the defects are based upon a direct-conversion type.

28. The RF transmission subsystem according to claim 26 wherein the transposition signal from said first frequency transposition stage has a first transposition frequency; and wherein said determination module includes:
an analog-to-digital converter to be coupled to the output of said auxiliary transposition module and configured to deliver a digital signal; and
a processor to be coupled to the output of said analog-to-digital converter and configured to perform a coherent estimation of the approximate values based upon a phase of the digital signal.

29. The RF transmission subsystem according to claim 28 wherein said processor is configured to perform a coherent estimation of the approximate values of the compensation parameters representative of the leaking transposition signal from said first frequency transposition stage; and wherein said processor includes:
a first correlation module configured to perform a first correlation processing on the digital signal with a complex exponential having the first frequency;
a second correlation module configured to perform a second correlation processing on the digital signal with a complex exponential having the second frequency; and
a computation module configured to calculate a ratio between a result of the second correlation processing and a result of the first correlation processing.

30. The RF transmission subsystem according to claim 28 wherein the transposed reference signal includes a third frequency component being an image of the first frequency component and having a third frequency; wherein said processor is configured to perform a coherent estimation of the approximate values of the compensation parameters representative of the mismatches of the two channels in phase quadrature; and wherein said processor comprises:
a first correlation module configured to perform a first correlation processing on the digital signal with a complex exponential having the first frequency;
a third correlation module configured to perform a third correlation processing on the digital signal with a complex exponential having the third frequency, the first processing and the third processing being performed with the phase of the digital signal; and
a computation module configured to calculate a ratio between a result of the third correlation processing and a result of the first correlation processing.

31. A system for processing defects in a radio frequency (RF) transmission subsystem comprising:
a calibration module including an estimating module configured to estimate compensation parameters representative of the defects and comprising
a generator to be coupled to the RF transmission subsystem and configured to provide a reference signal having a reference frequency, and
a determination module to be coupled to the RF transmission subsystem for receiving a resultant reference signal and configured to provide from the resultant reference signal an approximate value for each compensation parameter, said determination module comprising an auxiliary transposition module configured to perform a downward auxiliary frequency transposition of the resultant reference signal with an auxiliary transposition frequency to provide a transposed reference signal comprising a first frequency component representative of an echo of the reference signal and having a first frequency, and a second frequency component; and
a compensation module configured to receive the approximate values and to use the approximate values in the RF transmission subsystem.

32. The system according to claim 31 wherein the defects include at least one of a mismatch of two channels in phase quadrature of the RF transmission subsystem and a leaking transposition signal from a first frequency transposition stage of the RF transmission subsystem; wherein the transposition signal from the first frequency transposition stage has a first transposition frequency; wherein the auxiliary transposition frequency is different from the first transposition frequency; and wherein said determination module includes:

an analog-to-digital converter to be coupled to the output of said auxiliary transposition module and configured to deliver a digital signal; and a processor to be coupled to the output of said analog-to-digital converter and configured to perform a coherent estimation of the approximate values based upon a phase of the digital signal.

33. The system according to claim 32 wherein the second frequency component is representative of an echo of the leaking transposition signal and having a second frequency; and wherein said processor is configured to perform a coherent estimation of the approximate values of the compensation parameters representative of the leaking transposition signal from the first frequency transposition stage of the RF transmission subsystem; and wherein said processor includes:

a first correlation module configured to perform a first correlation processing on the digital signal with a complex exponential having the first frequency;

a second correlation module configured to perform a second correlation processing on the digital signal with a complex exponential having the second frequency; and a computation module configured to calculate a ratio between a result of the second correlation processing and a result of the first correlation processing.

34. The system according to claim 32 wherein the transposed reference signal includes a third frequency component being an image of the first frequency component and having a third frequency; wherein said processor is configured to perform a coherent estimation of the approximate values of the compensation parameters representative of the mismatches of the two channels in phase quadrature of the RF transmission subsystem; and wherein said processor comprises:

a first correlation module configured to perform a first correlation processing on the digital signal with a complex exponential having the first frequency;

a third correlation module configured to perform a third correlation processing on the digital signal with a complex exponential having the third frequency, the first processing and the third processing being performed with the phase of the digital signal; and a computation module configured to calculate a ratio between a result of the third correlation processing and a result of the first correlation processing.

* * * * *